US008041030B2

(12) United States Patent
Somers et al.

(10) Patent No.: US 8,041,030 B2
(45) Date of Patent: Oct. 18, 2011

(54) TECHNIQUES FOR EVALUATING LIVE PAYMENT TERMINALS IN A PAYMENT SYSTEM

(75) Inventors: Jean Somers, Grivegnee (BE); Paul Vanneste, Ottignies (BE)

(73) Assignee: Mastercard International Incorporated, Purchase, NY (US)

( * ) Notice: Subject to any disclaimer, the term of this patent is extended or adjusted under 35 U.S.C. 154(b) by 1223 days.

(21) Appl. No.: 11/621,295

(22) Filed: Jan. 9, 2007

(65) Prior Publication Data

US 2008/0165951 A1    Jul. 10, 2008

(51) Int. Cl.
*H04L 9/00* (2006.01)
*G06Q 20/00* (2006.01)
*H04K 1/00* (2006.01)

(52) U.S. Cl. .................. 380/2; 705/75; 705/73

(58) Field of Classification Search .......... 380/2; 705/7, 705/2, 73, 1.1, 75, 76, 80
See application file for complete search history.

(56) References Cited

U.S. PATENT DOCUMENTS

| | | | | |
|---|---|---|---|---|
| 5,818,738 A | * | 10/1998 | Effing | 702/117 |
| 2002/0022943 A1 | * | 2/2002 | Lapie | 702/183 |
| 2002/0029347 A1 | * | 3/2002 | Edelman | 713/193 |
| 2005/0119978 A1 | * | 6/2005 | Ates | 705/67 |
| 2006/0267611 A1 | * | 11/2006 | Corcoran et al. | 324/754 |
| 2007/0012763 A1 | * | 1/2007 | Van de Velde et al. | 235/380 |

FOREIGN PATENT DOCUMENTS

| | | |
|---|---|---|
| DE | 3822540 | 1/1990 |
| DE | 10015098 | 10/2001 |
| JP | 2007-317085 | * 5/2006 |
| WO | WO9948225 | 9/1999 |
| WO | WO2005120006 | 12/2005 |
| WO | WO2006030108 | 3/2006 |

* cited by examiner

*Primary Examiner* — Kambiz Zand
*Assistant Examiner* — Aubrey H Wyszynski
(74) *Attorney, Agent, or Firm* — Otterstedt, Ellenbogen & Kammer, LLP (57) ABSTRACT

Live payment terminals employing payment system public keys are evaluated. Dedicated test payment cards are internally issued by an operator of the payment system. Presentation of at least one of the cards to at least one of the terminals is facilitated. Testing the at least one of the terminals for proper management of the payment system public keys is facilitated. The testing can be in a test transaction conducted when the at least one of the cards is presented to the at least one of the terminals. The steps of facilitating presentation and facilitating testing can be conducted substantially without auditing.

38 Claims, 3 Drawing Sheets

TECHNIQUES FOR EVALUATING LIVE PAYMENT TERMINALS IN A PAYMENT SYSTEM

FIELD OF THE INVENTION

The present invention relates generally to electronic payment systems, and, more particularly, to techniques for evaluating terminals in such systems.

BACKGROUND OF THE INVENTION

Payment cards are used for enabling and securing payment transactions. Payment cards based on Integrated Circuit Cards (ICCs) provide for comprehensive (and complex) use of authentication techniques. One of these techniques allows the authentication of the card to the merchant by the so-called offline Card Authentication Method (offline CAM). This technique is implemented by ICCs that are compliant with the EMV (Europay-MasterCard-Visa) standard (discussed more fully below).

Offline Card Authentication Mechanism

ICCs offer the possibility of using public key cryptography for card authentication. EMV defines mechanisms that enable the payment terminal to authenticate the payment card "offline," that is, without requiring online communication to the card issuer during the transaction, and without requiring the card issuer and the terminal to share secret keys.

Such an offline card authentication is based on the ICC providing data that is signed, either statically or dynamically, by the private key of a party trusted by the terminal. This party is typically the card issuer or the card itself, and the trust relationship is established by having the terminal validate a certificate chain, up to a trusted root public key, which is owned by the payment system to which the issuer belongs.

The offline mechanism is either "static", wherein the same authentication data is provided by the card to the terminal for every transaction, or "dynamic," wherein the authentication data provided by the card will be different for each transaction. The EMV2000 specifications (discussed more fully below) define one static offline CAM, namely, Static Data Authentication (SDA), and two dynamic offline CAMs, namely, standard Dynamic Data Authentication (DDA), and Combined Data Authentication (CDA).

For SDA, the issuer pie-signs unique static card data using a private key to protect against alteration of the data after personalization. During a transaction, the terminal can retrieve this signed static data from the ICC and verify the correctness of the data. For both DDA and CDA the issuer personalizes the ICC with a private key unique to the ICC. During a transaction, the ICC produces a dynamic signature on a random challenge received from the terminal. By verifying this dynamic signature, the terminal can authenticate the ICC itself (under the assumption that the ICC private key is known only to the ICC), and confirm the legitimacy of static ICC data. Additionally, with CDA, the dynamic signature of the ICC covers all the transaction data necessary for the terminal to confirm the integrity of the ICC response for the current transaction. The underlying asymmetric signature algorithm is typically RSA (Rivest, Shamir and Adleman), but the same mechanism may be used with other asymmetric signature algorithms.

Card authentication is quite significant in payment transactions, as successful card authentication is typically a prerequisite to the conduct of an approved financial transaction and an enabler of other security techniques, such as offline Personal Identification Number (PIN) verification.

Payment System Keys

Payment system keys are a significant aspect of the EMV offline CAM Payment system public keys form the trusted root public key of an EMV certificate chain. Under the EMV specifications, each payment system generates several payment system key pairs, each including a payment system private key and the corresponding payment system public key. Each payment system generates its payment system key pairs in a secure system known as the payment system Certification Authority (CA).

Payment system private keys are used by the CA of each payment system to produce issuer public key certificates for the issuers. These certificates are stored by the issuers on the EMV ICCs that they issue. The payment system public keys are distributed by the relevant service of each payment system to all their acquires. The acquirers load them into their EMV terminals.

When an EMV offline transaction takes place at a terminal, the terminal identifies the payment system under which card issuance took place, then uses the relevant payment system public key to validate the issuer public key certificate read from the EMV ICCs. As described above, this validation step is a prerequisite to successful offline authentication of the card, and therefore to successful offline processing of the payment transaction.

Each payment system public key has an associated expiry date, which relates to the security properties of the key (that is, its resistance to attacks). Typically, the expiry date is determined by the key length. From time to time, existing payment system keys expire and are removed, while new payment system keys are introduced.

Payment System Keys and Interoperability

It is typically quite important that payment terminals are loaded with a correct set of payment system public keys. The unavailability of a valid payment system public key in a terminal adversely impacts the overall acceptance of cards. An EMV card featuring an issuer certificate generated using a given payment system private key can only be authenticated offline when the terminal is loaded with the corresponding payment system public key. If the relevant payment system public key is unavailable on the terminal, the transaction is either performed online (in the event that both (i) the terminal supports online authorization, and (ii) the card allows it) or declined.

The availability of an expired payment system public key in a terminal puts the payment scheme at risk. An EMV card featuring an issuer certificate generated using an expired payment system private key should normally not be accepted offline, as that private key is no longer secure.

In addition, the size of the keys (and of some related parameters, for instance with RSA keys, the size of the public modulus and the size and characteristics of the public exponent) impacts the terminal performance when performing offline CAM. Longer keys result in longer transaction times. When cards with long keys are used on slow terminals, performance may degrade down to a point where transaction time becomes unacceptably long, resulting in actual transaction failure.

Existing Terminal Testing Method

Testing of live terminals for the presence or absence of the payment system public keys and/or the correct operation of the offline CAM function is typically performed using live payment cards issued by a genuine issuer and loaded with valid certificate(s). Such an approach has several drawbacks. Payment systems have to pass agreements with some of their issuers that are keen issuing cards for test purposes. Some of these cards need to be personalized with the longest, most probably not yet deployed keys for the sole purpose of helping the payment system to conduct tests. Further, there is a financial risk associated with these cards as they could potentially be used frequently. Therefore, they are typically deployed under the control of accredited auditors, and can hardly be distributed to a wider panel. Yet further, the testers have to perform actual purchase transactions, hence generating costs to the payment system. Still further, tracing facilities need to be activated on the network conveying the financial transactions, and somewhat complex log analysis is required to check whether the transaction has been performed offline or online.

Accordingly, further improvements would be desirable.

SUMMARY OF THE INVENTION

Principles of the present invention provide techniques for evaluating terminals in a payment system for the presence or absence of the payment system public keys and/or the correct operation of the offline CAM function. In one aspect, an exemplary method of evaluating live payment terminals in a payment system includes steps as follows. The payment terminals employ payment system public keys. In one step, dedicated test payment cards (ICCs) are internally issued by an operator of the payment system. In another step, presentation of at least one of the cards to at least one of the terminals is facilitated. In yet another step, testing the at least one of the terminals for proper management of the payment system public keys is facilitated. The testing can be in a test transaction conducted when the at least one of the cards is presented to the at least one of the terminals. The steps of facilitating presentation and facilitating testing can be conducted substantially without auditing.

In another inventive aspect, an exemplary embodiment of a dedicated test payment card for evaluating live payment terminals of the kind just described includes a body portion and a memory associated with the body portion. A processor is associated with the body portion and coupled to the memory, and is operative to facilitate testing at least one of the terminals for proper management of the payment system public keys, in a test transaction conducted when the at least one of the cards is presented to the at least one of the terminals, substantially without auditing. The card is internally issued by an operator of the payment system and the memory and the processor ale cooperatively configured to permit the card to perform only dummy transactions.

In yet another aspect, an exemplary embodiment of a self-assessment toolkit for evaluating live payment terminals of the kind just described includes a set of test cards similar to those just described, a device (which may optionally be portable) featuring a card reader configured to read test data from the test cards, and a set of instructions indicating how to use the cards and the reader to evaluate the terminals.

One or more method steps of the present invention can be implemented in the form of an article of manufacture comprising a machine readable medium that contains one or more programs which when executed implement such step(s).

Techniques of the present invention can provide substantial beneficial technical effects. For example, one or more inventive embodiments may provide one or more of the following benefits:

Effectively addressing interoperability concerns, and allowing testers to:
  (i) easily validate the presence in live terminals of the correct payment system public keys,
  (ii) establish the absence of expired payment system public keys in live terminals, and/or
  (iii) conduct offline CAM performance measurements on live terminals.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
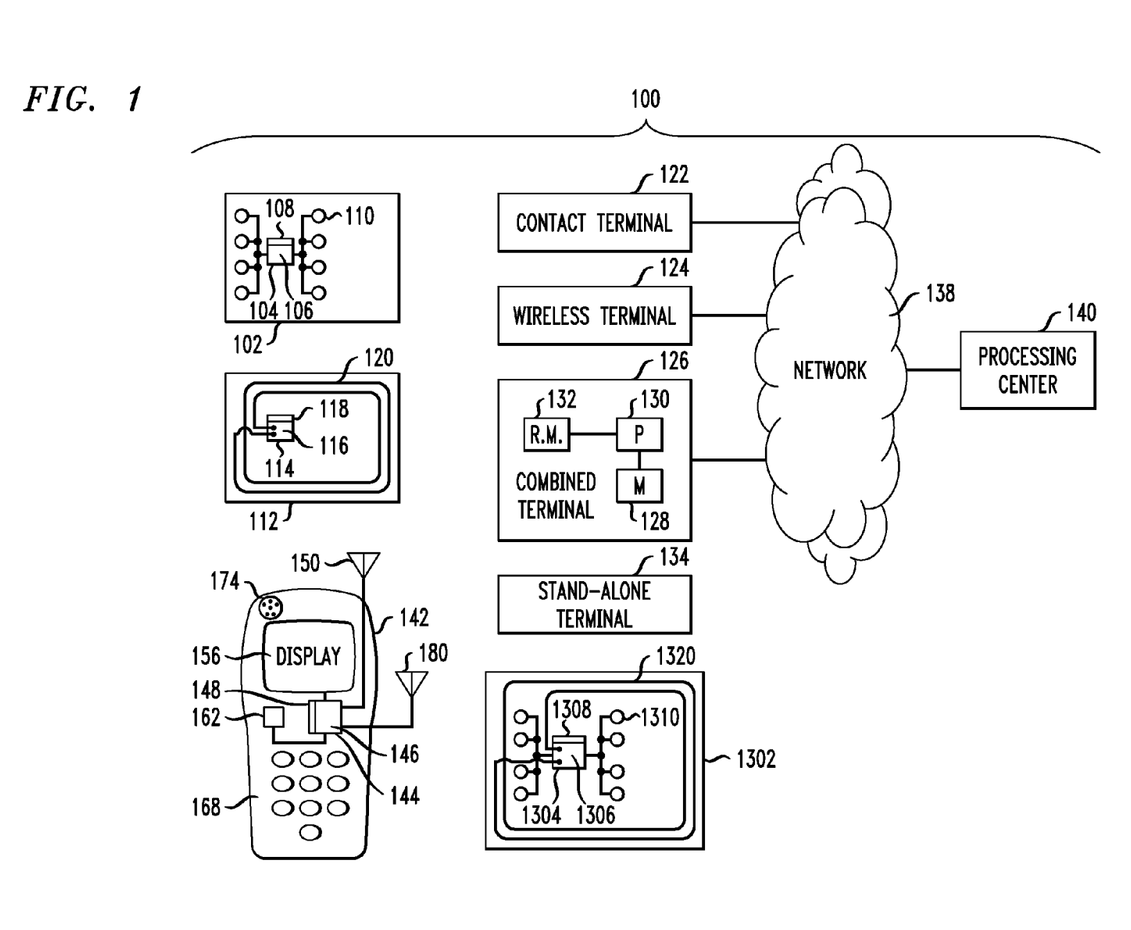
FIG. 1 shows an example of a system that can implement techniques of the present invention.

Attention should now be given to FIG. 1, which depicts an exemplary embodiment of a system 100 together with various possible components of the system. System 100 can include terminals to be tested using inventive techniques, and can include one or more different types of portable payment devices, including inventive test payment devices. One type of typical device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed with techniques of the present invention. In one or more embodiments of the invention, a dual-interface device 1302 is employed. Device 1302 is shown larger than devices 102, 112 for illustrative convenience but can have a similar form factor. Device 1302 includes an IC chip 1304 having a processor portion 1306 and a memory portion 1308. A plurality of electrical contacts 1310, similar to contacts 110, can be provided, as well as an antenna 1320 similar to antenna 120, together with an oscillator or oscillators, and/or additional appropriate circuitry for one or more of modulation, demodulation, downconversion, and the like, as described with regard to device 112. Appropriate firmware to manage the two available interfaces can be provided, with operation otherwise being similar to devices 102, 112. The description of devices, elements, or components 102, 104, 106, 108, 110, 112, 114, 116, 118, 120 throughout this document are equally applicable to the corresponding items 1302, 1304, 1306, 1308, 1310, 1320. Memories 108, 118, 148 (discussed below) and 1308 may further be divided into non-volatile and volatile memory.

The ICs 104, 114 can contain processing units 106, 116 and memory units 108, 118. Preferably, the ICs 104, 114 can also include one or more of control logic, a timer, and input/output ports. Such elements are well known in the IC art and ale not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory. The memory units can store transaction card data such as, e.g., a user's primary account number ("PAN"). The memory portions or units 108, 118 can store the operating system of the cards 102, 112. The operating system loads and executes applications and provides file management or other basic card services to the applications. In some embodiments, one or more applications may "sit" directly on hardware, e.g., may be outside the domain of the operating system. One operating system that can be used to implement the present invention is the MULTOS® operating system licensed by StepNexus Inc. Alternatively, JAVA CARD™-based operating systems, based on JAVA CARD™ technology (licensed by Sun Microsystems, Inc, 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications as described herein. At present, one preferred standard to which such applications may conform is the above-mentioned EMV payment standard set forth by EMVCo, LLC (http://www.emvco.com). It will be appreciated that, strictly speaking, the EMV standard defines the behavior of a terminal; however, the card can be configured to conform to such EMV-compliant terminal behavior and in such a sense is itself EMV-compliant. It will also be appreciated that applications in accordance with the present invention can be configured in a variety of different ways.

As noted, cards 102, 112 are examples of a variety of payment devices that can be employed with techniques of the present invention. The primary function of the payment devices may not be payment, for example, they may be cellular phone handsets, or access cards for a public transportation system, that implement techniques of the present invention. Such devices could include cards having a conventional form factor, smaller or larger cards, cards of different shape, key fobs, personal digital assistants (PDAs), appropriately configured cell phone handsets, or indeed any device with the processing and memory capabilities to implement techniques of the present invention. The cards, or other payment devices, can include memories 108, 118 and processors 106, 116 coupled to the memories. Optionally, body portions (e.g., laminated plastic layers of a payment card, case or cabinet of a PDA, chip packaging, and the like) are associated with memories 108, 118 and processors 106, 116. The memories 108, 118 can contain applications as described herein. The processors 106, 116 can be operative to execute one or more method steps to be described herein. The applications can be, for example, application identifiers (AIDs) linked to software code in the form of firmware plus data in a card memory such as an electrically erasable programmable read-only memory (EEPROM). Please note that the term "card" as used herein, including the claims, should be broadly understood to encompass payment devices of all form factors, including nontraditional devices such as cell phones and PDAs, which are configured to carry out the test techniques described herein.

A number of different types of terminals can be employed with system 100. Such terminals can include a contact terminal 122 configured to interface with contact-type device 102, a wireless terminal 124 configured to interface with wireless device 112, or a combined terminal 126. Note that "contactless" and "wireless" are used in an interchangeable fashion herein and that the skilled artisan is familiar with the meaning of such terminology. Combined terminal 126 is designed to interface with either type of device 102, 112. Terminals may be contact terminals with plug-in contactless readers. Combined terminal 126 can include a memory 128, a processor portion 130, and a reader module 132. Note that the principles of construction of terminal 126 are applicable to other types of terminals and are described in detail for illustrative purposes. Reader module 132 can be configured for contact communication with card or device 102, or contactless communication with card or device 112, or both (different types of readers can be provided to interact with different types of cards e.g., contacted or contactless). Terminals 122, 124, 126 can be connected to a processing center 140 via a computer network 138. Network 138 could include, for example, the Internet, or a proprietary network. Processing center 140 can include, for example, a host computer of an issuer of a payment device. One or more distinct networks can be employed.

Stand-alone terminal 134 is representative of a terminal that is not connected to a computer network (either not connected at a particular time, or not connected at all, by design), and is otherwise generally similar to the other terminals described. Any of the described terminals may, in one or more embodiments, be portable and may be part of an inventive test toolkit described below. The stand-alone terminal may have particular applicability to such toolkit.

An appropriately configured cellular telephone handset 142 can also be employed in system 100. Handset 142 is depicted in semi-schematic form in FIG. 1, and can include one or more IC chips such as chip 144 including a processing unit 146 and a memory unit 148. Wireless communication with a terminal can be provided via antenna 150 or with a second antenna 180 similar to above-described antenna 120 (i.e., the handset could have a second antenna for the payment application, different than the antenna for telephone communications). Note that antenna 180 is depicted schematically, but could be, e.g., a coil antenna as used in a typical "smart" card. Handsets 142 can each be equipped with a suitable display 156. Further, an appropriate power supply 162 can also be provided. Such power supplies can include, for example, a battery and appropriate circuitry. The display and power supply can be interconnected with the processor portion. Different types of portable payment devices can combine or "mix and match" one or more features depicted on the exemplary devices in FIG. 1.

In one aspect of the present invention, an electronic payment device, which may be portable, is provided for facilitating testing terminals, such as 122, 124, 126, 134, of a system such as system 100. The device (as noted, also loosely referred to as a card) can include a processor, for example, the processing units 106, 116, 146 discussed above. The device can also include a memory, such as memory portions 108, 118, 148 discussed above, that is coupled to the processor. Further, the device can optionally include a communications module that is coupled to the processor and configured to interface with a terminal such as one of the terminals 122, 124, 126, 134. The communications module can include, for example, the contacts 110 or antennas 120, 150, 180 together with appropriate circuitry (such as the aforementioned oscillator or oscillators and related circuitry) that permits interfacing with the terminals via contact or wireless communication. The processor of the apparatus can be operable to perform one or more steps of methods and techniques described herein. The processor can perform such operations via hardware techniques, and/or under the influence of program instructions stored in one of the memory units. The portable device can include a body portion. For example, this could be a laminated plastic body (as discussed above) in the case of "smart" cards 102, 112, or the handset chassis and body in the case of handset 142.

It will be appreciated that the terminals 122, 124, 126, 134 can function via hardware techniques in processor 130, or by program instructions stored in memory 128. Such logic could optionally be provided from a central location such as processing center 140 over network 138.

The above-described devices 102, 112 are preferably ISO 7816-compliant contact cards or devices or NFC (Near Field Communications) or ISO 14443-compliant proximity cards or devices. In operation, card 112 can be touched or tapped on the terminal 124 or 128, which then contactlessly transmits the electronic data to the proximity IC chip in the card 112 or other wireless device.

Figure 2:
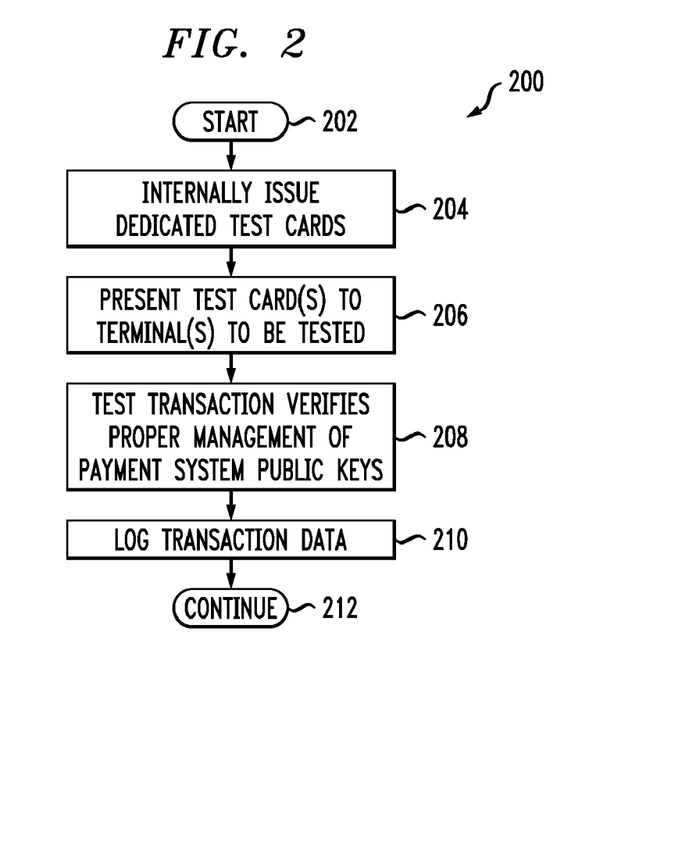
FIG. 2 is a flow chart of an exemplary method according to an aspect of the present invention.

Attention should now be given to FIG. 2, which shows a flow chart 200 of exemplary method steps in a method, which can be computer-implemented, of evaluating live payment terminals in a payment system, the payment terminals employing payment system public keys. It is to be emphasized that sequences and steps other than those shown in FIG. 2 are also within the scope of the present invention. After beginning at block 202, the method includes the step of internally issuing, by an operator of the payment system, dedicated test payment cards, the cards comprising integrated circuit cards (ICCs), as shown at block 204. In one or more embodiments, the dedicated test payment cards can be defined as Offline CAM Monitoring cards ("OCM cards"). OCM cards are intended to refer to EMV-compliant ICC payment cards personalized in such a way that they allow conducting tests of EMV live terminals for proper support of offline CAM without requiring control and audit on usage. Step 206 can include facilitating presentation of at least one of the cards to at least one of the terminals. As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

Step 208 includes facilitating testing the at least one of the terminals for proper management of the payment system public keys, in a test transaction conducted when the at least one of the cards is presented to the at least one of the terminals. The steps of facilitating presentation and facilitating testing are conducted substantially without auditing. The ability to function substantially without auditing is believed to be a significant added value of one or more embodiments of the invention. Deployment under control of auditors is a disadvantage of prior techniques—such cards allow for actual payment transactions, thus their usage must be controlled and audited, and hence the difficulty offering them to third parties. One or more embodiments of inventive cards can be used by acquirers without further control. It is presently believed that auditing is desirable for the internal issuing step. Within the context of the present specification and claims, "without auditing" is intended to convey the concept that one or more embodiments of inventive cards can be distributed to anyone without any further control, even though they are carrying live certificates.

As indicated at block 210, an optional additional step of logging transaction data for the test transaction can be performed, in a preferred embodiment, by one of the cards. In one or mole embodiments, the cards, the terminals, and the payment system conform to the EMV standard. In such case, the logging can include, by way of example and not limitation, logging of Terminal Verification Results indicating whether a given one of the terminals successfully performed an EMV-compliant offline CAM. Processing continues at block 212.

In one or more embodiments, the testing is offline testing. In a case where the cards, the terminals, and the payment system conform to the EMV standard, the public keys are associated with at least an offline card authentication method (CAM); and the offline CAM comprises an EMV-compliant offline CAM, for example, static data authentication (SDA).

The testing step 208 can, in one or more embodiments, be conducted by a third party (that is, someone other than the payment system operator). Block 206, the step of facilitating presentation, could include, by way of example and not limitation, facilitating distributing the cards to at least one acquirer (the terminals to be tested could be terminals of the acquirer).

In one or more embodiments, the operator of the payment system is not a genuine card issuer. That is, the operator of the payment system (for example, MasterCard International Incorporated) is not itself an entity that issues payment cards (typically, these are issued by an issuer such as a bank affiliated with the payment system). Thus, stating that the operator of the payment system is not a genuine card issuer does not imply any attempt at fraud, but rather that the operator of the payment system does not itself normally issue cards. In one or more embodiments, the cards have issuer certificates signed by a certification authority associated with the operator of the payment system, and the certificates expire at a date substantially further in the future than do certificates of a genuine card issuer.

In one or more embodiments, the test transaction comprises a dummy transaction, and the cards are configured to permit performance of only dummy transactions. In order to limit the cards to dummy transactions, the cards may each have a primary account number (PAN) unassigned to a genuine card issuer and the configuration to permit only the dummy transactions can be accomplished at least via the PANs being unassigned to a genuine card issuer. In a case where the cards, the terminals, and the payment system conform to the EMV standard, the cards may be programmed to answer cryptogram request (Generate AC) commands with an application authentication cryptogram (AAC). Yet further, the cards may have an Application Effective Date data element, and an Application Expiration Date data element set to an earlier date than the Application Effective Date data element. Both data elements can be included within the Signed Static Application Data. The intent of having an Application Expiration Date set to an earlier date then the Application Effective Date is to make sure that the terminal will at least go online (if not decline offline) for any putative transaction. This technique may have particular applicability to SDA cards, for example, in order to avoid the possibility, or reduce the chance, that fraudulent cards could be built that would carry data read from genuine OCM cards but would not behave as genuine OCM cards. Given the teachings herein, the skilled artisan will be able to devise other ways of limiting the cards to dummy transactions, where this is desired, and the example in this paragraph should not be taken as limiting.

As noted above, in prior art techniques, tracing facilities need to be activated on the network conveying the financial transactions, and somewhat complex log analysis is required to check whether the transaction has been performed offline or online. In one or more embodiments of the invention, the method can be conducted substantially without tracing.

In one or more embodiments, issuer private keys are used for creating the cards, and the issuer private keys are generated in a tamper resistant security module. As will be discussed in greater detail below, the issuer private keys are advantageously used in a controlled and audited environment and destroyed immediately after use.

Figure 3:
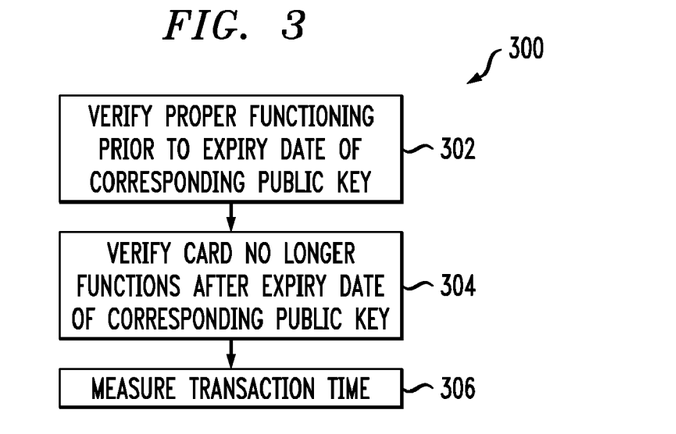
FIG. 3 is a flow chart of exemplary detailed test steps.

Attention should now be given to FIG. 3, which shows a flow chart 300 of exemplary detailed steps for testing. In one or more embodiments, each of the public keys has a corresponding expiry date, each of the cards corresponds to a given one of the expiry dates and a given one of the public keys, and, as shown at block 302, the testing step comprises at least verifying that a given one of the cards functions properly prior to the given one of the expiry dates of the given one of the public keys with which the given one of the cards corresponds. Another possible detailed test step is shown at block 304, involving verifying that the given one of the cards no longer functions after the given one of the expiry dates of the given one of the public keys with which the given one of the cards corresponds lest cards, such as the aforementioned OCM cards, should be seen by terminals as live cards. Hence they feature live certificates generated using the private keys of the live CA. Effectuating the purpose of steps 302 and 304 essentially requires that the expiry dates of these keys be extended on the live CA. It should be ensured by technical and procedural measures (which depend on the way the CA operates) that while the expiry dates are transiently modified, no certificates are generated other than those for OCM or other test cards. The skilled artisan will be able to institute such measures for a particular CA, given the teachings herein. As shown at step 306, the testing optionally further includes measuring a transaction time of the test transaction.

One or more inventive embodiments may avoid one or more drawbacks of the prior art, by using dedicated test cards issued internally by the payment system, which can be used by any external party to test live terminals for proper support of offline CAM. Further details, summary and reiteration will now be provided regarding an exemplary manner in which such cards can be created and used.

Generation of Test Cards Such as OCM Cards

The payment system can act as a card issuer; and can issue OCM cards or other test cards. Such cards can be production cards, which log relevant transaction data for each transaction they perform. Such data could include, for example, the Terminal Verification Results, which indicate whether the terminal correctly performed offline CAM. By way of example and not limitation, such cards may advantageously be cheap cards supporting Static Data Authentication (SDA) offline CAM only.

OCM or other test cards can be personalized with issuer certificates signed by the live payment system CA. However, unlike the issuer certificates of normal payment cards, their issuer certificates can be set to expire at a date far in the future rather than at a normal expiry date as would typically be done for a real issuer certificate.

Inventive cards can be used to check proper management of the payment system public keys in live terminals in the following way. Before the expiry date of a particular payment system public key, the corresponding OCM card should successfully pass offline CAM on a live terminal (as per block 302). After the removal date of a particular payment system public key (that is, for example, six months after its expiry date), the corresponding OCM card should fail offline CAM on a live terminal (as per block 304). One possible way to conduct step 306 is for the transaction timing to be measured manually by the personnel in charge of the tests, and compared to acceptable timings. In other approaches, the measuring of the timing could be facilitated by appropriate software and/or hardware on a test card. In one or more embodiments, the OCM cards or other test cards are distributed to acquirers, which use them to test their live terminals for correct support of offline CAM.

Risk Management

Some potential risks of one or more of the inventive techniques are as follows:

1. OCM cards are cards personalized to be used on live terminals. They are intended be distributed to acquirers without any further control. Hence there is a risk that some OCM cards could be misused by fraudulent individuals attempting to conduct actual payment transactions.

2. OCM cards may be SDA cards. Such cards are known to be vulnerable to cloning attacks. If an attacker would clone OCM cards, he or she could attempt to conduct transactions using such clones. Such clones would not necessarily behave like genuine OCM cards; for instance they could bypass genuine card risk management.

Both threats may create a financial risk to the payment system, as in one or more embodiments, there is no actual issuer to incur the cost of any fraudulent transaction.

With SDA, terminals check that card-provided Signed Static Application Data (SSAD) is signed by an issuer private key whose public counterpart is certified by the payment system CA. Hence fraudsters attempting to clone a card cannot modify the SSAD, but only copy it SSAD stored on OCM cards do not allow OCM cards to successfully conduct any transaction. This can be achieved, for example, by the following:

1. Bits 6 and 7 of byte 2 from the 'Issuer Action Code—Denial' data element are set to 1 (such data element is well-known to the skilled artisan from the EMV standard; as per EMV specifications this data element is five eight-bit bytes long), 2. The 'Application Expiration Date' data element is set to a earlier date than the 'Application Effective Date' data element, and 3. These three data elements are included into the SSAD.

As per EMV specifications, any EMV-compliant terminal declines any transaction conducted with such a card (however, this does not preclude the terminal properly conducting the offline CAM validation process). This is indeed the case for genuine OCM cards as well as for any clone thereof.

As an extra security measure, the OCM cards can be programmed to decline any transaction by always answering any 'Generate AC' commands with an AAC. Also, all OCM cards receive certificates for a test PAN prefix, that is, a valid PAN for the payment system that is unassigned to any actual issuer and that cause transaction decline when used in an online authorization.

When creating OCM cards, the payment system acts as an issuer, and in that role requests certificates from the payment system CA that would normally only be delivered to issuers, under their sole responsibility. Hence, it is important to guarantee that keys submitted to the payment system CA in the frame of the project are only used to sign SSAD for OCM cards as described above. Similarly, generating certificates for OCM cards involves transiently modifying the expiry dates of the payment system keys on the CA.

As noted above, OCM cards must be seen by terminals as live cards. Hence they feature live certificates generated using the private keys of the live CA. It must be ensured by technical and procedural measures (which depend on the way the CA operates) that while the expiry dates are transiently modified, no other certificates is generated than those for OCM cards.

As also noted above, the issuer private keys used for creating OCM cards are preferably generated in a Tamper Resistant Security Module, used in a controlled and audited environment, and destroyed immediately after use. Note, such auditing and control refers to the issuer private keys, not the cards themselves, which as noted, can be advantageously employed substantially without auditing. The issuer private key usage should be controlled in order to avoid issuing fraudulent cards (that is, cards with another behavior than the one intended) with these keys. This applies also to some extent to the issuer public key, whose integrity has to be maintained until a proper certificate has been generated by the CA. All processes are preferably performed in a way consistent with the security level applied to all certificate requests processed by the payment system EMV CA. Any deviation from the standard registration, certificate generation and certificate distribution processes should be duly documented and agreed to.

Use of OCM Cards

This method may be implemented, for example, by the distribution to chip acquirers or to any third party of an assessment tool allowing them to efficiently validate that their live EMV terminals correctly perform the EMV offline CAM process, as per the payment system key management policy, and with acceptable timing. A self-assessment toolkit for evaluating live payment terminals in a payment system (the payment terminals employing payment system public keys) may typically include a set of test cards, of the kind described herein, a device (which may optionally be portable) featuring a card reader configured to read test data from the test cards, and a set of instructions indicating how to use the cards and the reader to evaluate the terminals. The card reader can be, for example, in the form of a stand-alone reader or a standard personal computer (PC) card reader. Where desired or required, appropriate dedicated software and card reader drivers can be included. The instructions may further advise how to use the software and how to read the test results. Card and reader functions may be combined when a device such as a mobile phone or the like is used as a card to test contactless terminals. The toolkit as set forth herein, including the claims, is intended to encompass this possibility as well (that is, set of cards and device incorporating reader realized in same component).

Additional Comments on Test Cards

In view of the foregoing discussion, it wilt be appreciated that a dedicated test payment card for evaluating live payment terminals in a payment system (the payment terminals employing payment system public keys) can include a body position, such as discussed above with regard to FIG. 1, a memory, such as 108, 118, 148, 1308, associated with the body portion, and a processor, such as 106, 116, 146, 1306, associated with the body portion and coupled to the memory. The processor can be operative to facilitate testing at least one of the terminals 122, 124, 126, 134 for proper management of the payment system public keys, in a test transaction conducted when the card is presented to the terminal, substantially without auditing. The card can be internally issued by an operator of the payment system, and the memory and the processor are cooperatively configured to permit the card to per form only dummy transactions.

In one or more embodiments, the card, the terminals, and the payment system conform to the EMV standard, the public keys are associated with at least an offline card authentication method (CAM), and the offline CAM comprises an EMV-compliant offline CAM, for example, static data authentication (SDA). The processor can be operative to facilitate any one or more of the method steps described above, for example, by executing one or more programs in the memory. While it is believed preferable that techniques of the present invention are implemented entirely or primarily on a card or other payment device, it should be understood that in other embodiments, method steps and actions described herein can be performed by a payment device, a terminal, or a combination of the foregoing.

Figure 4:
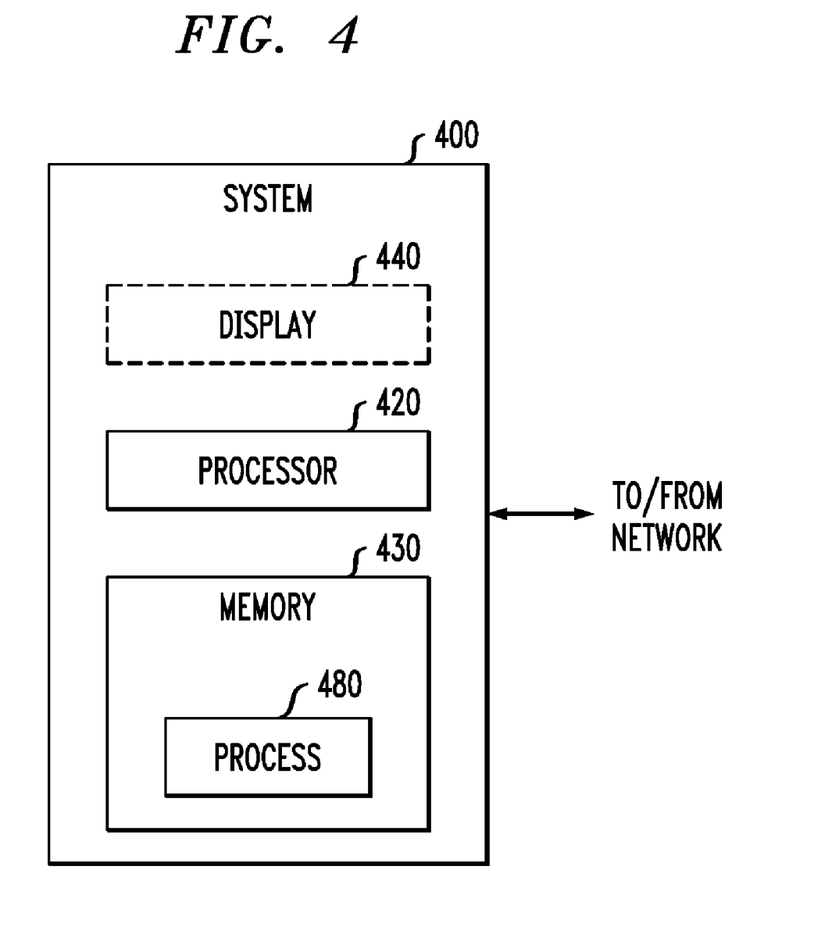
FIG. 4 is a block diagram of an exemplary computer system useful in one or more embodiments of the present invention.

The invention can employ hardware and/or software aspects. Software includes but is not limited to firmware, resident software, microcode, etc. Software might be employed, for example, in connection with a terminal 122, 124, 126, 134. Firmware might be employed, for example, in connection with payment devices such as cards 102, 112. FIG. 4 is a block diagram of a system 400 that can implement part or all of one or mole aspects or processes of the present invention. As shown in FIG. 4, memory 430 configures the processor 420 (which could correspond, e.g., to processor portions 106, 116) to implement one or more aspects of the methods, steps, and functions disclosed herein (collectively, shown as process 480 in FIG. 4). The memory 430 could be distributed or local and the processor 420 could be distributed or singular. The memory 430 could be implemented as an electrical, magnetic or optical memory, or any combination of these or other types of storage devices (including memory portions as described above with respect to cards 102, 112). It should be noted that if distributed processors are employed, each distributed processor that makes up processor 420 generally contains its own addressable memory space. It should also be noted that some or all of computer system 400 can be incorporated into an application-specific or general-use integrated circuit. For example, one or more method steps could be implemented in hardware in an ASIC rather than using firmware. Display 440 is representative of a variety of possible input/output devices. Interconnection with a network is optional; for example, one or more inventive apparatuses may be stand-alone (for example, a stand-alone card reader).

System and Article of Manufacture Details

As is known in the art, part or all of one or more aspects of the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer readable code means is any mechanism for allowing a computer to lead instructions and data, such as magnetic variations on a magnetic media or height variations on the surface of a compact disk.

The computer systems and servers described herein each contain a memory that will configure associated processors to implement the methods, steps, and functions disclosed herein. Such methods, steps, and functions can be carried out, e.g., by processing capability on elements 102, 112, 142, 122, 124, 126, 134, 140, or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention, such as, for example, the aforementioned terminals 122, 124, 126, 134 or payment devices such as cards 102, 112 can make use of computer technology with appropriate instructions to implement method steps described herein. By way of further example, a terminal apparatus 122, 124, 126, 134 could include a communications module, an antenna coupled to the communications module, a memory, and at least one processor coupled to the memory and the communications module and operative to interrogate a contactless payment device (in lieu of the antenna and communications module, appropriate contacts and other elements could be provided to interrogate a contact payment device such as a contact card).

Accordingly, it will be appreciated that one or more embodiments of the present invention can include a computer program comprising computer program code means adapted to perform one or all of the steps of any methods or claims set forth herein when such program is run on a computer; and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of evaluating live payment terminals in a payment system, said payment terminals employing payment system public keys, said method comprising the steps of:
   internally issuing, by an operator of said payment system, dedicated test payment cards, said cards comprising integrated circuit cards (ICCs);
   facilitating presentation of at least one of said cards to at least one of said terminals; and
   facilitating testing said at least one of said terminals for proper management of said payment system public keys, in a test transaction conducted when said at least one of said cards is presented to said at least one of said terminals;
   wherein said steps of facilitating presentation and facilitating testing are conducted substantially without auditing.

2. The method of claim 1, wherein said testing comprises offline testing.

3. The method of claim 2, wherein:
   said cards, said terminals, and said payment system are EMV-compliant;
   said public keys are associated with at least an offline card authentication method (CAM); and
   said offline CAM comprises an EMV-compliant offline CAM.

4. The method of claim 3, wherein said EMV-compliant offline CAM comprises static data authentication (SDA).

5. The method of claim 2, wherein:
   each of said public keys has a corresponding expiry date;
   each of said cards corresponds to a given one of said expiry dates and a given one of said public keys; and
   said testing comprises at least verifying that a given one of said cards functions properly prior to said given one of said expiry dates of said given one of said public keys with which said given one of said cards corresponds.

6. The method of claim 5, wherein said testing further comprises verifying that said given one of said cards no longer functions after said given one of said expiry dates of said given one of said public keys with which said given one of said cards corresponds.

7. The method of claim 6, wherein said testing further comprises measuring a transaction time of said test transaction.

8. The method of claim 1, wherein said testing is conducted by a third party.

9. The method of claim 1, wherein said facilitating presentation step comprises at least facilitating distributing said cards to at least one acquirer and where said terminals are terminals of said acquirer.

10. The method of claim 1, wherein said operator of said payment system is not a genuine card issuer.

11. The method of claim 10, wherein said cards have issuer certificates signed by a certification authority associated with said operator of said payment system, and wherein said certificates expire at a date substantially further in future than do certificates of a genuine card issuer.

12. The method of claim 1, wherein said method is conducted substantially without tracing.

13. The method of claim 1, further comprising the additional step of facilitating logging transaction data for said test transaction, said logging being performed by said one of said cards.

14. The method of claim 13, wherein said cards, said terminals, and said payment system are EMV-compliant, and wherein said logging comprises at least logging of Terminal Verification Results indicating whether a given one of said terminals successfully performed an EMV-compliant offline card authentication method (CAM).

15. The method of claim 1, wherein said test transaction comprises a dummy transaction.

16. The method of claim 15, wherein said cards are configured to permit performance of only dummy transactions.

17. The method of claim 16, wherein said cards each have a primary account number (PAN) unassigned to a genuine card issuer and wherein said configuration to permit only said dummy transactions is accomplished at least via said PANs being unassigned to a genuine card issuer.

18. The method of claim 17, wherein said cards, said terminals, and said payment system are EMV-compliant, and wherein said cards are programmed to always answer all cryptogram request (Generate AC) commands with an application authentication cryptogram (AAC).

19. The method of claim 18, wherein:
   said cards have an Application Effective Date data element; and said cards have an Application Expiration Date data element set to an earlier date than said Application Effective Date data element.

20. The method of claim 1, wherein issuer private keys are used for creating said cards and wherein said issuer private keys are generated in a tamper resistant security module.

21. A dedicated test payment card for evaluating live payment terminals in a payment system, said payment terminals employing payment system public keys, said card comprising:
  a body portion;
  a memory associated with said body portion; and
  a processor associated with said body portion and coupled to said memory, said processor being operative to facilitate testing at least one of the terminals for proper management of the payment system public keys, in a test transaction conducted when the at least one of the cards is presented to the at least one of the terminals, substantially without auditing;
  wherein said card is internally issued by an operator of said payment system and said memory and said processor are cooperatively configured to permit said card to perform only dummy transactions.

22. The card of claim 21, wherein:
  said card, the terminals, and the payment system are EMV-compliant;
  the public keys are associated with at least an offline card authentication method (CAM); and
  the offline CAM comprises an EMV-compliant offline CAM.

23. The card of claim 22, wherein the EMV-compliant offline CAM comprises static data authentication (SDA).

24. The card of claim 21, wherein:
  each of the public keys has a corresponding expiry date;
  said card corresponds to a given one of the expiry dates and a given one of the public keys; and
  said processor is operative to facilitate said testing at least by verifying that said card functions properly prior to said given one of the expiry dates of the given one of the public keys with which said card corresponds.

25. The card of claim 24, wherein processor is further operative to facilitate said testing by verifying that said card no longer functions after said given one of the expiry dates of the given one of the public keys with which said card corresponds.

26. The card of claim 25, wherein said processor is further operative to facilitate said testing by measuring a transaction time of said test transaction.

27. The card of claim 21, wherein the operator of the payment system is not a genuine card issuer.

28. The card of claim 27, wherein said card has an issuer certificate signed by a certification authority associated with the operator of the payment system, and wherein said certificate expires at a date substantially further in future than do certificates of a genuine card issuer.

29. The card of claim 21, wherein said processor is further operative to facilitate logging transaction data for the test transaction.

30. The card of claim 22, wherein said card, the terminals, and the payment system are EMV-compliant, and wherein said transaction data comprises at least Terminal Verification Results indicating whether a given one of the terminals successfully performed an EMV-compliant offline card authentication method (CAM).

31. The card of claim 21, wherein said card, the terminals, and the payment system are EMV-compliant, and wherein said memory and said processor are cooperatively configured to always answer all cryptogram request (Generate AC) commands with an application authentication cryptogram (AAC).

32. The card of claim 21, wherein said card, the terminals, and the payment system are EMV-compliant, and wherein said memory stores Signed Static Application Data (SSAD), said SSAD in turn comprising:
  an 'Issuer Action Code—Denial' data element having at least first and second bytes, each with eight bits, with sixth and seventh bits from said second byte set to 1;
  an 'Application Effective Date' data element; and
  an 'Application Expiration Date' data element set to an earlier date than said 'Application Effective Date' data element.

33. The card of claim 32, wherein said memory stores a primary account number (PAN) and wherein said cooperative configuration to permit only said dummy transactions is accomplished at least via said PAN being unassigned to a genuine card issuer.

34. The card of claim 21, wherein an issuer private key is used for creating said card and wherein said issuer private key is generated in a tamper resistant security module.

35. A self-assessment toolkit for evaluating live payment terminals in a payment system, the payment terminals employing payment system public keys, said toolkit comprising:
  a set of test cards, each of said test cards being internally issued by an operator of said payment system and comprising:
    a body portion;
    a memory associated with said body portion; and
    a processor associated with said body portion and coupled to said memory, said processor being operative to facilitate testing at least one of the terminals for proper management of the payment system public keys, in a test transaction conducted when the at least one of the cards is presented to the at least one of the terminals, substantially without auditing, said memory and said processor being cooperatively configured to permit said card to perform only dummy transactions;
  a reading device configured to read test data from said test cards; and
  a set of instructions indicating how to use said cards and said device to evaluate the terminals.

36. The toolkit of claim 35, wherein at least one of said cards has a traditional form factor.

37. The toolkit of claim 35, wherein at least one of said cards comprises a nontraditional payment device and wherein said reading device is realized in said nontraditional payment device.

38. The toolkit of claim 35, wherein:
  said operator of said payment system is not a genuine card issuer;
  said cards have issuer certificates signed by a certification authority associated with said operator of said payment system; and
  said certificates expire at a date substantially further in future than do certificates of a genuine card issuer.

* * * * *